United States Patent
Gharpure et al.

(10) Patent No.: US 10,337,385 B2
(45) Date of Patent: Jul. 2, 2019

(54) INJECTOR DEPOSIT DETECTION FOR SCR INJECTION SYSTEM

(71) Applicant: Perkins Engines Company Limited, Peterborough (GB)

(72) Inventors: Siddharth Subhash Gharpure, Peterborough (GB); Stuart Smith, Stamford (GB); James K. McCloskey, Stamford (GB); Tom Carlill, Stamford (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 15/828,883

(22) Filed: Dec. 1, 2017

(65) Prior Publication Data

US 2018/0163605 A1 Jun. 14, 2018

(30) Foreign Application Priority Data

Dec. 12, 2016 (EP) .................................... 16203475

(51) Int. Cl.
  *F01N 11/00* (2006.01)
  *F01N 3/20* (2006.01)
  *F01N 3/28* (2006.01)

(52) U.S. Cl.
  CPC .......... *F01N 11/002* (2013.01); *F01N 3/208* (2013.01); *F01N 3/2896* (2013.01); *F01N 11/00* (2013.01); *F01N 2550/05* (2013.01); *F01N 2610/144* (2013.01); *F01N 2610/146* (2013.01); *F01N 2610/1493* (2013.01); *F01N 2900/1808* (2013.01); *Y02T 10/24* (2013.01); *Y02T 10/47* (2013.01)

(58) Field of Classification Search
  CPC .......... F01N 2550/05; F01N 2610/144; F01N 2610/146; F01N 2610/1493; F01N 2900/1808
  See application file for complete search history.

(56) References Cited

U.S. PATENT DOCUMENTS

| | | | |
|---|---|---|---|
| 8,881,507 B2 | 11/2014 | Yan et al. | |
| 8,893,470 B2 | 11/2014 | Shin | |
| 2008/0295492 A1 | 12/2008 | Karkkainen et al. | |
| 2011/0099983 A1 | 5/2011 | Ohno | |
| 2011/0107742 A1 | 5/2011 | Igarashi et al. | |
| 2014/0325961 A1* | 11/2014 | Yokota | F01N 3/208 60/274 |
| 2016/0040577 A1 | 2/2016 | Nihongi et al. | |
| 2016/0298515 A1 | 10/2016 | Gharpure et al. | |

FOREIGN PATENT DOCUMENTS

| | | | |
|---|---|---|---|
| EP | 2578834 A1 | 4/2013 | |
| EP | 2787185 A1 | 10/2014 | |
| JP | 2002-242663 A | 8/2002 | |
| WO | 2011/161175 A1 | 12/2011 | |

\* cited by examiner

*Primary Examiner* — Jonathan R Matthias

(57) ABSTRACT

A method for monitoring an SCR injection system is disclosed. The method includes operating a pump, and measuring a first pressure drop value in the SCR injection system during actuation of a reductant injector. A second pressure drop value in the SCR injection system is measured during a further actuation of the reductant injector. It is determined to perform a deposit mitigation strategy based on the first pressure drop value and the second pressure drop value.

18 Claims, 6 Drawing Sheets

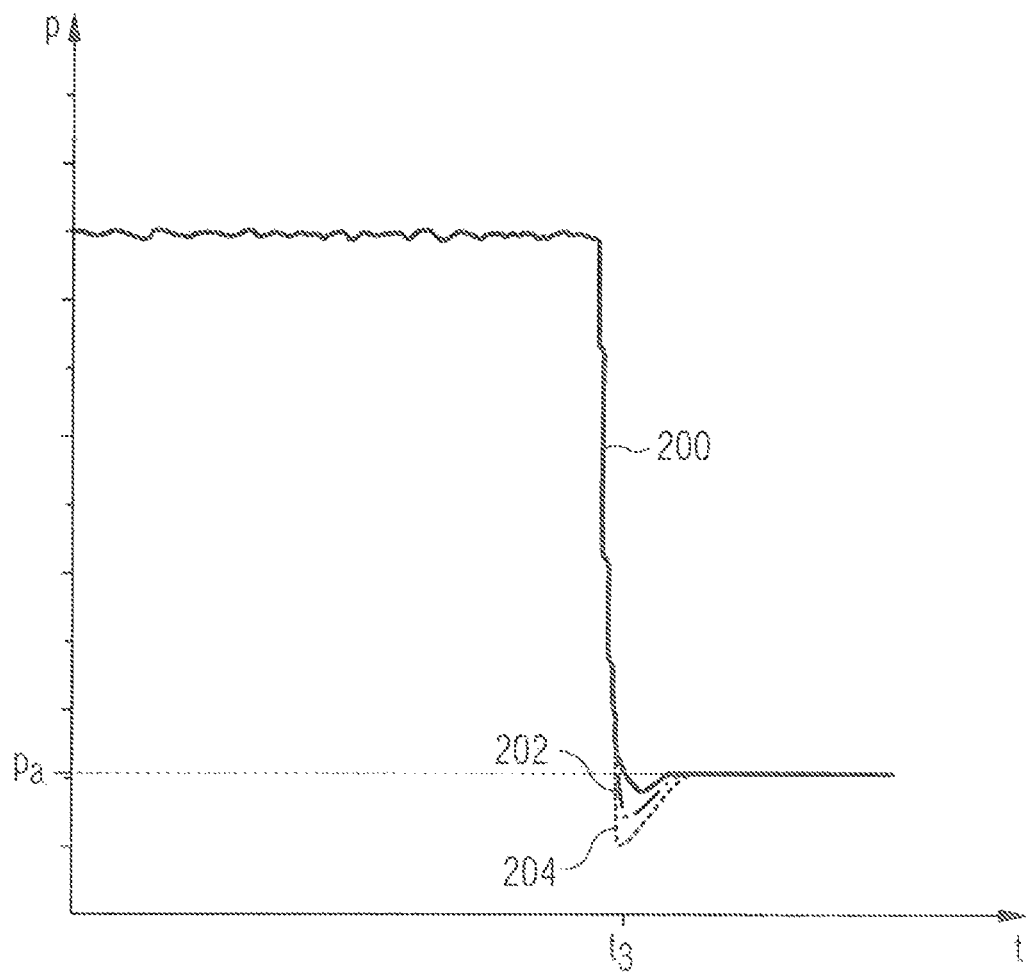

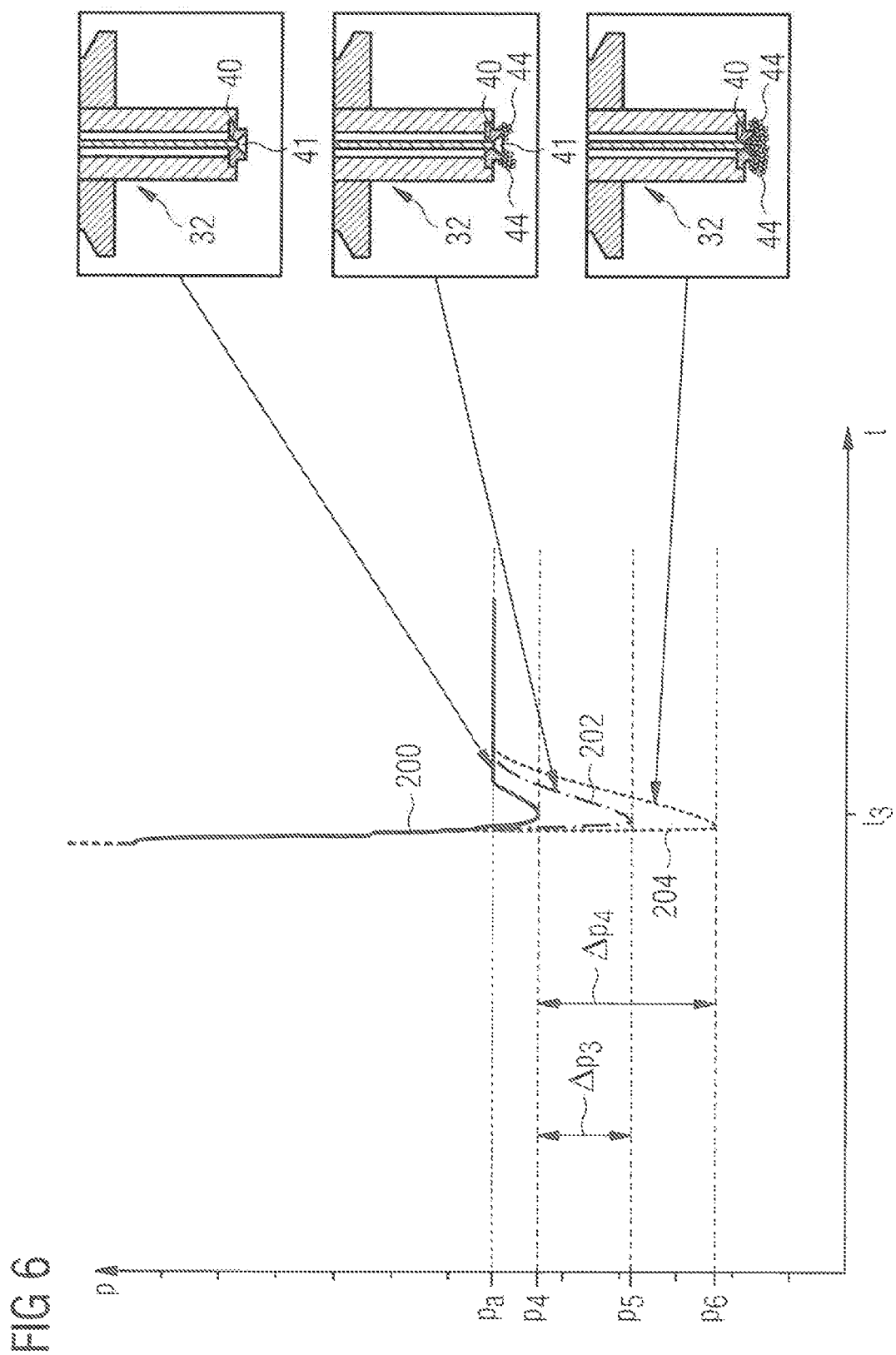

INJECTOR DEPOSIT DETECTION FOR SCR INJECTION SYSTEM

CLAIM FOR PRIORITY

This application claims benefit of priority of European Patent Application No. 16203475.5, filed Dec. 12, 2016, which is incorporated herein by reference.

TECHNICAL FIELD

The present disclosure relates to a method for monitoring an SCR injection system, and a related SCR injection system.

BACKGROUND

Engine systems for vehicles and the like may comprise an aftertreatment module for removing unwanted gaseous emissions or pollutants from the exhaust gases of an internal combustion engine. In particular, a selective catalytic reduction system (SCR) may be provided in the exhaust gas system for removing nitrogen oxides (NOx). Typically, an SCR system comprises a reductant injector reaching into a mixing pipe located upstream of a catalyst. The reductant injector may inject a liquid reductant into the exhaust gases before they contact the catalyst. Suitable liquid reductants may include anhydrous ammonia, aqueous ammonia and urea. The high temperature of the exhaust gases may evaporate the liquid reductant and upon contact with the catalyst, the gaseous reductant may react with the NOx in the exhaust gas to form nitrogen and water.

However, if the exhaust gas temperature is too low, such as during low engine load conditions and in low duty cycles, the reductant may be deposited as solid compounds on components of the SCR system. In particular, the reductant may be deposited on or around an outlet nozzle of the reductant injector when eddy currents in the exhaust gas flow redirect injected reductant back onto the outlet nozzle. In addition, the reductant injector may undesirably leak small volumes of reductant, particularly when it is fully pressurized, onto the outlet nozzle. Since the outlet nozzle of the reductant injector may have a relatively low surface temperature due to low exhaust gas temperature, the redirected and leaked reductant may condense on it and the liquid components of the reductant may evaporate. Solid reductant deposits may subsequently be left on the outlet nozzle, which may therefore become partially or fully blocked. This may lead to increased reductant deposit growth and cause poor SCR system conversion efficiency. Additionally, for example, re-circulation zones in the exhaust mass flow caused by the design of the exhaust lines may cause deposits at or near a nozzle outlet of the reductant injector.

For example, US 2016/0298515 A1 of Perkins Engines Company Limited discloses a method of controlling an engine system having an aftertreatment module within which a reductant injector is located. The reductant injector may be controlled to inject reductant fluid to expel solid reductant deposits formed on the reductant injector.

The present disclosure is directed, at least in part, to improving or overcoming one or more aspects of prior systems.

SUMMARY OF THE DISCLOSURE

In one aspect, a method for monitoring an SCR injection system is disclosed. The SCR injection system includes a pump and a reductant injector. The pump is operated. A first pressure drop value in the SCR injection system is measured during actuation of the reductant injector. A second pressure drop value in the SCR injection system is measured during a further actuation of the reductant injector. It is determined to perform a deposit mitigation strategy based on the first pressure drop value and the second pressure drop value.

In another aspect, an SCR injection system for an internal combustion engine is disclosed. The SCR injection system comprises a reductant tank, a reductant injector, and a pump fluidly connecting the reductant tank and the reductant injector. A pressure sensor measures a pressure in the SCR injection system. A control unit performs a method as disclosed herein.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIG. 5 is a graph showing different pressure developments during a purging operation of an SCR injection system; and FIG. 6 is an enlarged view of a section of FIG. 5 showing different pressure drop developments during the purging operation of the SCR injection system, and associated states of an outlet of a reductant injector.

DETAILED DESCRIPTION

Figure 1:
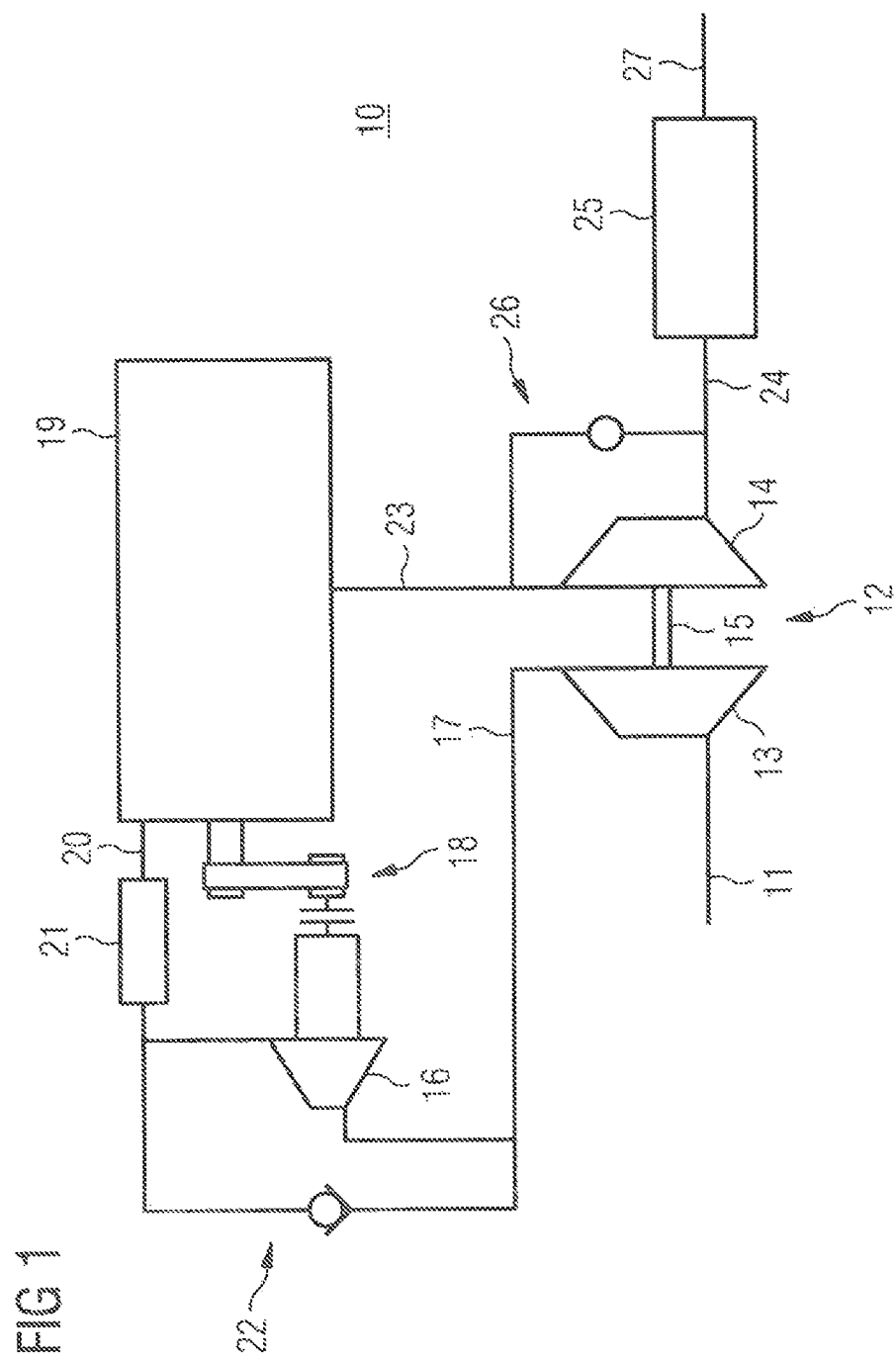
FIG. 1 is a schematic of an engine system suitable for implementing a method and SCR injection system according to the present disclosure.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure is based in part on the realization that deposits at an outlet of a nozzle of a reductant injector reduce a flow cross-section through the reductant injector. Accordingly, the deposits can be detected by monitoring pressure drop developments during actuation of the reductant injector. Particularly, it was found that the pressure developments during priming and purging operations of an SCR injection system are suitable for detecting deposits at the outlet of the nozzle of the reductant injector, because they show particularly characteristic pressure developments.

The present disclosure is further based in part on the realization that a determination to perform a deposit mitigation strategy is based on two subsequently measured pressure drop values. Particularly, a comparison between two or more measured pressure drop values measured during subsequent key cycles increases the detection resolution compared to a comparison between one measured pressure drop value and a predetermined threshold. The comparison between two subsequently measured pressure drop values allows to detect also small relative changes in the system behavior.

FIG. 1 illustrates an exemplary embodiment of an engine system 10 suitable for implementing the method and SCR injection system of the present disclosure. The engine system 10 comprises an engine 19, and an aftertreatment module 25. Additionally, as shown in FIG. 1, the engine system 10 may comprise a turbocharger 12, a supercharger 16, and a cooler 21.

Particularly, the engine system 10 comprises a first conduit 11 for directing intake gas, such as atmospheric air, to the turbocharger 12. The turbocharger 12 comprises a turbocharger compressor 13. The turbocharger compressor 13 is connected to the first conduit 11 and arranged to be driven by a turbine 14 via a shaft 15. The engine system 10 further comprises the supercharger 16 for receiving intake gas from the turbocharger compressor 13 via a second conduit 17. A supercharger drive arrangement 18 may be provided for selectively driving the supercharger 16. The engine 19 is arranged to provide power to the supercharger 16 mechanically via the supercharger drive arrangement 18.

In the shown embodiment, the engine system 10 further comprises a third conduit 20 for directing the intake gas from the supercharger 16 to the cooler 21. The engine system 10 further comprises a supercharger bypass arrangement 22 for selectively allowing intake gas to bypass the supercharger 16.

The engine 19 may be an internal combustion engine, such as a compression-ignition or spark-ignition engine. Fuel, such as diesel, gasoline or natural gas, may be selectively provided to engine cylinders in the engine 19 to combust with the intake gas and drive the pistons, thereby rotating a crankshaft and providing an engine output torque and power. The by-product of the combustion process is exhaust gas, which is directed from the engine cylinders along a fifth conduit 23 of the engine system 10 for example, via an exhaust manifold. The exhaust gas may comprise unwanted gaseous emissions or pollutants, such as nitrogen oxides (NOx), particulate matter (such as soot), sulphur oxides, carbon monoxide, unburnt hydrocarbons and/or other organic compounds. The fifth conduit 23 directs exhaust gas from the engine 19 to the turbine 14 of the turbocharger 12. The engine system 10 further comprises a sixth conduit 24 for directing exhaust gas from the turbine 14 to the exhaust aftertreatment module 25. A turbine bypass arrangement 26 may be provided for selectively allowing exhaust gas to bypass the turbine 14.

The exhaust aftertreatment module 25 receives and treats the exhaust gas to remove pollutants prior to directing the exhaust gas to atmosphere via a seventh conduit 27.

Figure 2:
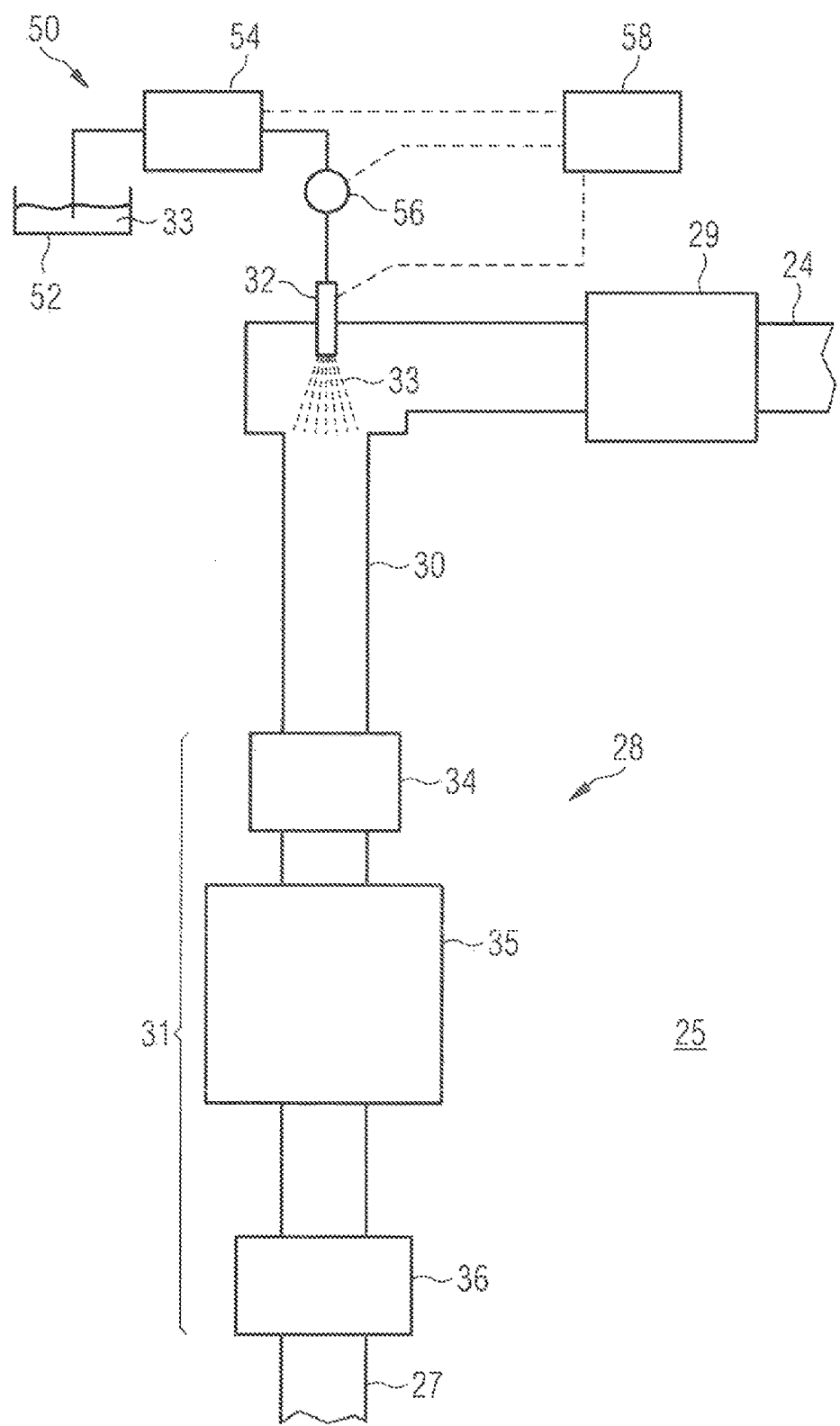
FIG. 2 is a schematic of an exhaust aftertreatment module of the engine of FIG. 1.

As illustrated in further detail in FIG. 2, the exhaust aftertreatment module 25 may comprise a selective catalytic reduction (SCR) system 28 and may comprise a diesel oxidation catalyst (DOC) 29. The DOC 29 may be arranged to receive exhaust gases from the sixth conduit 24 and located upstream of the SCR system 28. The SCR system 28 comprises an SCR conduit 30 leading from the DOC 29 to an SCR catalyst arrangement 31. The SCR system 28 further comprises an SCR injection system 50.

The SCR injection system 50 comprises a reductant injector 32, a reductant tank 52, and a pump 54. The reductant injector 32 reaches into the SCR conduit 30 for selectively injecting reductant fluid 33 into the SCR conduit 30 upstream of the SCR catalyst arrangement 31. The reductant tank 52 is configured to store the reductant fluid 33, which may comprise aqueous urea, aqueous ammonia or the like In particular, the reductant fluid 33 may be diesel exhaust fluid (DEF) and the DEF may meet the ISO22241 standard and comprise from 31.8% to 33.2% urea by weight. The pump 54 is configured to pump the reductant fluid 33 from the reductant tank 52 to the reductant injector 32 during priming and normal operations. The pump 54 is further configured to pump a fluid from the reductant injector 32 to the reductant tank 52 during a purging operation. For example, the pump 54 may be a diaphragm pump. Additionally, a fluid pressure sensor 56 is arranged and configured to measure a fluid pressure of the reductant fluid 33 in and/or downstream of the pump 54. In the shown embodiment, the fluid pressure sensor 56 is connected to a fluid connection between the pump 54 and the reductant injector 32. Alternatively, for example, the fluid pressure sensor 56 may be integrated in the pump 54 and/or in the reductant injector 32

Furthermore, a control unit 58 is communicatively connected to the pump 54, the pressure sensor 56 and the reductant injector 32. The control unit 58 is configured to receive pressure data from the pressure sensor 56, to control the pump 54, and to control (actuate) the reductant injector 32.

In the shown embodiment, the SCR catalyst arrangement 31 comprises, in the direction of exhaust gas flow, a mixer 34, a catalyst substrate 35 and a further oxidation catalyst or AMOx 36. The reductant injector 32 may selectively inject the reductant fluid 33, preferably as a liquid, into the stream of exhaust gas to provide a dose of reductant fluid 33 to the SCR catalyst arrangement 31. The high exhaust gas temperature may cause the reductant fluid 33 to evaporate and the resulting combination of gases may contact the catalyst substrate 35. The reductant fluid 33 may react with the NOx in the exhaust gas to reduce it to nitrogen and water, which may pass out of the engine system 10 via the seventh conduit 27. The catalyst substrate 35 may comprise zeolites, vanadium or the like.

The engine system 10 may further comprise at least one sensor arranged to sense one or more parameters relating to one or more of the components of the engine system 10 and send signals relating thereto to the control unit 58. In particular, the engine system 10 may comprise a temperature sensor in communication with the control unit 58 for determining the exhaust gas temperature at the outlet of the engine 19 and/or in the exhaust aftertreatment module 25. In some embodiments, the control unit 58 may also be in communication with one or more actuators for controlling the operation of the engine 19. In particular, the control unit 58 may be operable to control the turbocharger 12, the supercharger 16, the rate of fuel injection to the engine 19 and the injection of the reductant fluid 33 by the reductant injector 32. The control unit 58 may be a computer and may be operable to store and implement one or more computer programs and may comprise at least one memory, at least one processing unit and at least one communication means. The control unit 58 may be an engine control unit (ECU).

Figure 3:
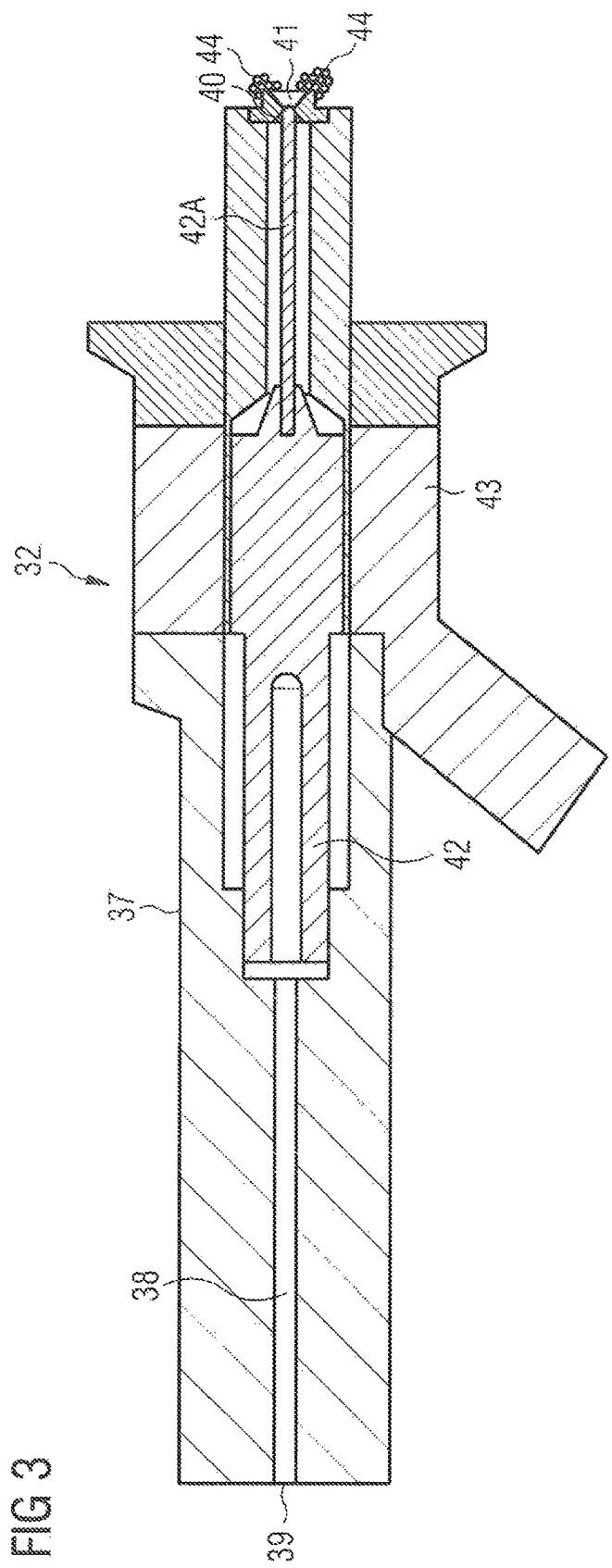
FIG. 3 is a schematic of a reductant injector of the exhaust aftertreatment module of FIG. 2.

An exemplary reductant injector 32 suitable for such an engine system 10 is illustrated in FIG. 3. The reductant injector 32 comprises a housing 37 for mounting in the SCR system 28, particularly in the wall of the SCR conduit 30, upstream of the SCR catalyst arrangement 31. Inside the housing 37 a passageway 38 leads from a reductant fluid inlet 39 to a nozzle 40 and injector or nozzle outlet 41. The reductant fluid inlet 39 is in fluid communication with the pump 54 (see FIG. 2). A valve member 42, for example including a needle element 42A, is located within the passageway 38. The valve member 42 is moveable by an actuator 43 between an open position and a closed position. The actuator 43 may be an electrically activated solenoid or the like. The actuator 43 is communicatively connected to the control unit 58 such that the control unit 58 controls the movement of the valve member 42 (the needle element 42A) between the open and closed positions. The closed position is illustrated in FIG. 3.

During operation of the engine system 10, the control unit 58 controls the injection of reductant fluid 33 in order to control the reduction of NOx by the SCR system 28. During injection, the reductant fluid 33 may be directed back onto the nozzle 40 after injection by eddy currents or gas recirculation in exhaust gases passing through the SCR conduit 30. Additionally, when the reductant injector 32 is in the closed position reductant fluid 33 may leak through the injector outlet 41 due to the high pressure of the reductant fluid 33 in the passageway 38. Leakage of reductant fluid 33 may be particularly likely in aged and worn reductant injectors 32. The leaked reductant fluid 33 may cause reductant fluid 33 to deposit on the nozzle 40. The amount leaked and deposited may be increased if the reductant injector 32 is not opened for a prolonged period of time. The nozzle 40 may typically have a relatively low surface temperature, such as around 100° C., such that the reductant fluid 33 on the nozzle 40 may condense. The liquid components of the reductant fluid 33 may subsequently evaporate and solid reductant deposits 44 may remain on the nozzle 40. FIG. 3 illustrates the reductant injector 32 in the closed position with solid reductant deposits 44 formed on the nozzle 40 partially blocking the injector outlet 41. The interruption of flow of the reductant fluid 33 from the reductant injector 32 may reduce the conversion efficiency of the SCR system 28. If these solid reductant deposits 44 build up further they may fully block the injector outlet 41.

The present disclosure suggests to detect formation of deposits at or near the nozzle 40 by comparing pressure drop values of the SCR injection system 50. The pressure drop values are measured by the pressure sensor 56 during actuation of the reductant injector 32 at different times. The comparison between two subsequently measured pressure drop values increases the detection resolution compared to a comparison between one measured pressure drop value and a predetermined threshold. One reason may be that the predetermined threshold is always set as a compromise considering that systems do not behave identical behaviors, and system behaviors change over time, etc. In contrast, the comparison between two or more subsequently measured pressure drop values allows to detect also small relative changes in the system behavior, and to determine suitable countermeasures if required.

Particularly, herein it is suggested to compare pressure drop values measured during consecutive priming operations of the SCR injection system 50 and/or consecutive purging operations of the SCR injection system 50. It was found that those operation modes are particularly suitable, because deviations in the pressure drop due to formation of deposits are particularly quantifiable during those operation modes. Additionally, typically, the engine 10, and thus the SCR injection system 50, are operated over a prolonged period of time between consecutive priming operations and consecutive purging operations, respectively. Particularly, a shutdown and restart, or a stop-start of the SCR injection system 50) may separate consecutive priming operations and consecutive purging operations. More particularly, each (re- or stop-) start of the SCR injection system 50 triggers one priming operation, and each shutdown of the SCR injection system 50 triggers one purging operation. The internal combustion engine 10 may be idle or may be shutdown and restarted when the SCR injection system 50 performs a stop-start or a shutdown and a restart.

As used herein, the term "priming operation" refers to an operation mode of the SCR injection system 50, in which the SCR injection system 50 is made ready for operation. The priming operation includes activating the pump 54 to pump reductant from the reductant tank 52 to the reductant injector 32. The priming operation further includes actuating the reductant injector 32 to move into the open position. Simultaneously to the actuation of the reductant injector 32, a pressure drop occurs in the SCR injection system 50.

As used herein, the term "purging operation" refers to an operation mode of the SCR injection system 50, in which the SCR injection system 50 removes remaining reductant in the SCR injection system 50. The purging operation includes activating and operating the pump 54 to pump remaining reductant from the reductant injector 32 back to the reductant tank 52. The purging operation further includes actuating the reductant injector 32 to move into the open position. An end of the purging operation is indicated by a negative pressure building up in the SCR injection system 50, particularly between the pump 54 and the reductant injector 32, because no fluid is left in the reductant injector 32 and the fluid connection to the pump 54. During purging operation, a pressure drop occurs in the SCR injection system.

The following exemplary methods include a comparison of two measured pressured drop values. However, it should be noted that in other embodiments more than two pressure drop values may be compared.

Figure 4:
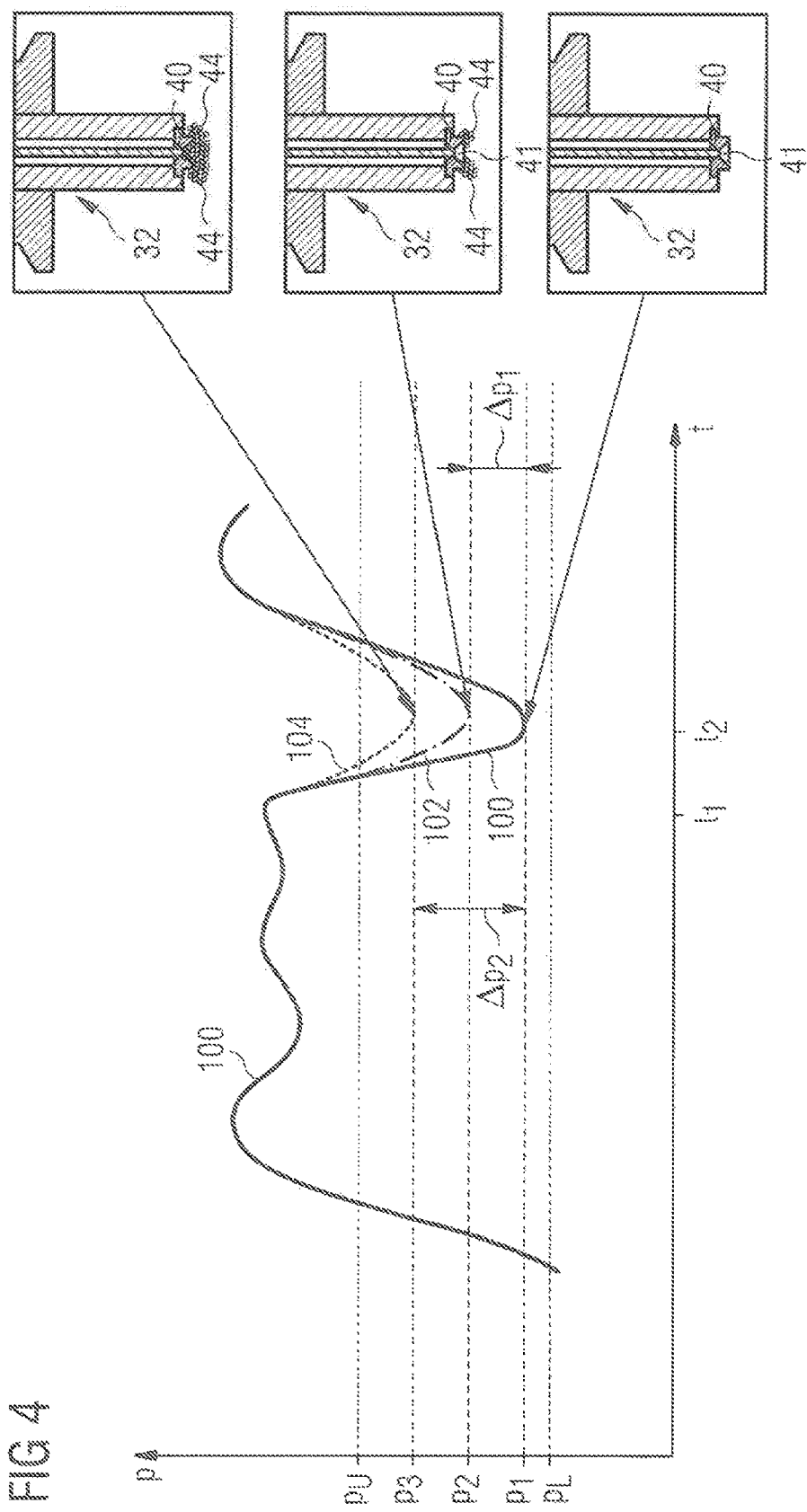
FIG. 4 is a graph showing different pressure developments during a priming operation of an SCR injection system, and associated states of an outlet of a reductant injector.

Referring to FIG. 4, a first exemplary method performed during consecutive priming operations of the SCR injection system 50 is described in the following.

FIG. 4 shows three exemplary pressure developments of different priming operations measured by the pressure sensor 56 of the SCR injection system 50.

A first pressure development is indicated by a solid line and referred to by reference numeral 100. A second pressure development is indicated by a dashed-dotted line and referred to by reference numeral 102. Lastly, a third pressure development is indicated by a dotted line and referred to by reference numeral 104.

As can be seen in FIG. 4, during priming operation, the pressure in the SCR injection system 50 increases due to operation of the pump 54. At about point in time $t_1$, the reductant injector 32 is actuated (opened). As a result, the pressure drops. Specifically, the first pressure development 100 drops to a first pressure drop value $p_1$, the second pressure development 102 drops to a second pressure drop value $p_2$, and the third pressure drop development 104 drops to a third pressure drop value $p_3$. After closing the reductant injector 32 at about point in time t2, pressure developments 100-104 increase again.

Assuming a first situation, in which during a first priming operation of the SCR injection system 50, the first pressure drop value $p_1$ has been measured, and during a second, consecutive priming operation of the SCR injection system 50, the second pressure drop value $p_2$ has been measured. A first deviation $\Delta p_1$ is calculated. The first deviation $\Delta p_1$ is compared to a first deviation pressure drop threshold. In case of the first deviation $\Delta p_1$ exceeding the first deviation pressure drop threshold, it is determined that a deposit mitigation strategy is required for cleaning the nozzle 40. In case of the first deviation $\Delta p_1$ not exceeding the first deviation pressure drop threshold, it is determined that no deposit mitigation strategy is required. In the example shown in FIG. 4, the first deviation $\Delta p_1$ indicates that operation of the reductant injector 32 is already deteriorated due to deposits 44 at the nozzle 40, although the reductant injector 32 is still operable.

Assuming a second situation, in which during a first priming operation of the SCR injection system 50, the pressure drop value $p_1$ has been measured, and during a second, consecutive priming operation of the SCR injection system 50, the third pressure drop value $p_3$ has been measured. A second deviation $\Delta p_2$ is calculated. The second deviation $\Delta p_2$ is compared to the first deviation pressure drop threshold. In the example shown in FIG. 4, the second deviation $\Delta p_2$ indicates that operation of the reductant injector 32 is considerably deteriorated due to deposits at the nozzle 40, although the reductant injector 32 is still operable.

Since the second deviation $\Delta p_2$ is greater than the first deviation $\Delta p_1$, a more effective deposit mitigation strategy may be chosen in the second situation compared to the first situation. In other words, the method further allows to select a suitable deposit mitigation strategy based on the first and second pressure drop values $p_1$ and $p_2$, particularly an amount of the calculated deviation. The method step of performing a deposit mitigation strategy for reducing deposits at an outlet of the injector further comprises selecting one deposit mitigation strategy from a plurality of deposit mitigation strategies based on the deviation pressure value.

Examples of deposit mitigation strategies include increasing the exhaust gas temperature, increasing an exhaust gas mass flow, pumping a reductant to the reductant injector to dissolve deposits, and/or increasing a dosing rate for the SCR injection. For example, a "enhanced" deposit mitigation strategy may include increasing the exhaust gas temperature to a higher temperature than a standard" deposit mitigation strategy.

For example, the first deviation pressure drop threshold may be within a range between about 0.1 bar and about 1.9 bar, particularly up to about 1 bar, more particularly up to about 0.5 bar.

In some embodiments, the method may further comprise, for each measured pressure drop value $p_1$ to $p_3$, determining whether the respective pressure drop value $p_1$, $p_2$ or $p_3$ is within a predetermined acceptable range for operation. The predetermined acceptable range extends between an upper limit $p_U$ and a lower limit $p_L$ as indicated in FIG. 4. For example, for an SCR injection system having an operation pressure of about 9 bar, the upper pressure limit $p_U$ may be about 8 bar, and the lower pressure limit $p_L$ may be about 6 bar. The predetermined acceptable range may be set to determine if the reductant injector 32 is inoperable, for example due to a failure of the valve member 42, the actuator 43, and/or considerable deposits in the SCR injection system 50.

Referring to FIGS. 5 and 6, a second exemplary method performed during consecutive purging operations of the SCR injection system 50 is described in the following. FIG. 6 shows a detail of FIG. 5 showing different pressure drop developments during the purging operation of the SCR injection system, and associated states the outlet 41 of the reductant injector 32.

A fourth pressure development is indicated by a solid line and referred to by reference numeral 200. A fifth pressure development is indicated by a dashed-dotted line and referred to by reference numeral 202. Lastly, a sixth pressure development is indicated by a dotted line and referred to by reference numeral 204.

As can be seen in FIG. 5, during purging operation, the pressure in the SCR injection system 50, particularly in a passage between a pump impeller of the pump 54 and the nozzle outlet 41 of the reductant injector 32, decreases. The pressure decreases, because the pump 54 is operated to pump fluid from the reductant injector 32 to the reductant tank 52 for cleaning the piping of the SCR injection system 50 from residues of the reductant 33. During the purging operation, the reductant injector 32 is opened. The pump 54 creates a vacuum to remove fluid from the piping of the SCR injections system 50 during purging operation. The fluid carries residue drops of the reductant 33. The nozzle outlet 41 acts as an orifice so that after a period of time, a pressure within the SCR injection system 50 drops below atmosphere pressure $p_a$ (about 1 bar). The amount of the pressure drop below atmosphere pressure indicates a flow cross-section through the nozzle outlet 41. The more the nozzle outlet 41 is clogged, less will be the flow through the outlet 41.

Specifically, the fourth pressure development 200 drops to a fourth pressure drop value $p_4$, the fifth pressure development 202 drops to a second pressure drop value $p_5$, and the sixth pressure drop development 204 drops to a sixth pressure drop value $p_6$.

Assuming a third situation, in which during a first purging operation of the SCR injection system 50, the fourth pressure drop value $p_4$ has been measured by the pressure sensor 56. During a second, consecutive purging operation of the SCR injection system 50, the fifth pressure drop value $p_5$ has been measured. A third deviation $\Delta p_3$ is calculated form the fourth pressure drop value $p_4$ and the fifth pressure drop value $p_5$. The third deviation $\Delta p_3$ is compared to a second deviation pressure drop threshold (other than the first deviation pressure drop threshold for the priming operation). In case of the third deviation $\Delta p_3$ exceeding the second deviation pressure drop threshold, it is determined that a deposit mitigation strategy is required for cleaning the nozzle 40. In case of the third deviation $\Delta p_3$ not exceeding the deviation pressure drop threshold, it is determined that no deposit mitigation strategy is required. In the example shown in FIG. 5, the deviation $\Delta p_3$ indicates that operation of the reductant injector 32 is already deteriorated due to deposits 44 at the nozzle 40, although the reductant injector 32 is still operable. The deposit mitigation strategy may be performed during a subsequent restart of the SCR injection system 50.

Assuming a fourth situation, in which during a first purging operation of the SCR injection system 50, the fourth pressure drop value $p_4$ has been measured. During a second, consecutive priming operation of the SCR injection system 50, the sixth pressure drop value $p_6$ has been measured. A fourth deviation $\Delta p_4$ is calculated. The fourth deviation $\Delta p_4$ is compared to the respective deviation pressure drop threshold. In the example shown in FIG. 5, the deviation $\Delta p_4$ indicates that operation of the reductant injector 32 is considerably deteriorated due to deposits 44 at the nozzle 40, although the reductant injector 32 is still operable. Additionally, a more effective deposit mitigation strategy may be chosen in the fourth situation than in the third situation, because the fourth deviation $\Delta p_4$ is greater than the third deviation $\Delta p_3$ (the fifth pressure drop value $p_5$ is greater than the sixth pressure drop value $p_6$).

For the exemplary method described with reference to FIGS. 5 and 6 the deposit mitigation strategy, if any, may be implemented after the SCR injections system 50 has started again at a later time.

For example, the second deviation pressure drop threshold may be within a range between about 0.1 bar and about 0.9 bar. A pressure drop value indicating a clean nozzle outlet 41 may be about 0.9 mbar, and a pressure drop value indicating a clogged nozzle outlet 41 may be lower than 0.9 mbar, for example between about 0.4 mbar and 0.7 mbar.

As one skilled in the art will appreciate, the above described first and second exemplary methods may be combined so that the method includes comparing pressure drop values of consecutive priming operations of the SCR injection system 50, and comparing pressure drop values of consecutive purging operations of the SCR injection system 50. The method may then perform a deposit mitigation strategy if a deviation of the pressure drop values measured during consecutive priming operations exceeds a first threshold and/or if a deviation of the pressure drop values measured during consecutive purging operation exceeds a second threshold.

INDUSTRIAL APPLICABILITY

The method for monitoring an SCR injection system, and the SCR injection system as disclosed herein are applicable in internal combustion engines equipped with an SCR system.

Terms such as "about", "around", "approximately", or "substantially" as used herein when referring to a measurable value such as a parameter, an amount, a temporal duration, and the like, is meant to encompass variations of ±10% or less, preferably ±5% or less, more preferably ±1% or less, and still more preferably ±0.1% or less of and from the specified value, insofar as such variations are appropriate to perform in the disclosed invention. It is to be understood that the value to which the modifier "about" refers is itself also specifically, and preferably, disclosed.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Although the preferred embodiments of this invention have been described herein, improvements and modifications may be incorporated without departing from the scope of the following claims.

What is claimed is:

1. A method for monitoring a selective catalytic reduction (SCR) injection system for an internal combustion engine, the SCR injection system including a pump and a reductant injector, the method including:
   operating the pump;
   measuring a first pressure drop value in the SCR injection system during a first actuation of the reductant injector;
   measuring a second pressure drop value in the SCR injection system during a second actuation of the reductant injector, the second actuation occurring after the first actuation;
   calculating a first deviation, the first deviation being a magnitude of the first pressure drop value minus the second pressure drop value;
   comparing the first deviation to a first predetermined threshold; and
   performing a deposit mitigation strategy for reducing deposits at an outlet of the reductant injector in response to the first deviation exceeding the first predetermined threshold.

2. The method of claim 1, wherein the first pressure drop value and the second pressure drop value are each measured during a priming operation of the SCR injection system, in which the SCR injection system is prepared for operation by operating the pump to deliver a fluid to the reductant injector.

3. The method of claim 2, wherein the first pressure drop value is measured during a first priming operation, and the second pressure drop value is measured during a second priming operation, the second priming operation occurring after the first priming operation.

4. The method of claim 3, wherein the first priming operation and the second priming operation are separated by a shutdown and a restart of the internal combustion engine.

5. The method of claim 3, wherein the first priming operation and the second priming operation are separated by a stop-start of the SCR injection system.

6. The method of claim 1, further comprising determining whether at least one of the first pressure drop value and the second pressure drop value is within a preset acceptable pressure range.

7. The method of claim 1, wherein the first pressure drop value and the second pressure drop value are each measured during a purging operation of the SCR injection system, in which the SCR injection system is purged.

8. The method of claim 7, wherein the first pressure drop value is measured during a first purging operation, and the second pressure drop value is measured during a second purging operation, the second purging operation occurring after the first purging operation.

9. The method of claim 8, wherein the first purging operation and the second purging operation are separated by a shutdown and a restart of the internal combustion engine.

10. The method of claim 8, wherein the first purging operation and the second purging operation are separated by a stop-start of the SCR injection system.

11. The method of claim 7, wherein the pump is operated to draw a fluid away from the reductant injector during the purging operation.

12. The method of claim 7, further comprising:
   measuring a third pressure drop value in the SCR injection system during a third actuation of the reductant injector, the third actuation being a first priming operation of the SCR injection system;
   measuring a fourth pressure drop value in the SCR injection system during a fourth actuation of the reductant injector, the fourth actuation being a second priming operation of the SCR injection system, the second priming operation occurring after the first priming operation;
   calculating a second deviation, the second deviation being a magnitude of the third pressure drop value minus the fourth pressure drop value;
   comparing the second deviation to a second predetermined threshold; and
   performing the deposit mitigation strategy in response to the second deviation exceeding the second predetermined threshold.

13. The method of claim 12, wherein the first priming operation and the second priming operation are separated by a shutdown and a restart of the SCR injection system.

14. The method of claim 12, wherein the pump is operated to pump a fluid to the reductant injector during each of the first priming operation and the second priming operation.

15. The method of claim 1, further comprising selecting the deposit mitigation strategy from a plurality of deposit mitigation strategies based on the first pressure drop value and the second pressure drop value.

16. The method of claim 1, wherein the deposit mitigation strategy includes at least one of increasing an exhaust gas temperature, increasing an exhaust gas mass flow, pumping a reductant to the reductant injector, and increasing a dosing rate of the reductant to the reductant injector.

17. A selective catalytic reduction (SCR) injection system for an internal combustion engine, the SCR injection system comprising:
   a reductant tank;
   a reductant injector;
   a pump fluidly connecting the reductant tank and the reductant injector;
   a pressure sensor configured to measure a pressure in the SCR injection system; and
   a control unit operatively coupled to the pressure sensor and the pump, the control unit being configured to
   operate the pump;
   measure a first pressure drop value in the SCR injection system during a first actuation of the reductant injector;
   measure a second pressure drop value in the SCR injection system during a second actuation of the reductant injector, the second actuation occurring after the first actuation;
   calculate a first deviation, the first deviation being a magnitude of the first pressure drop value minus the second pressure drop value;
   compare the first deviation to a first predetermined threshold; and
   perform a deposit mitigation strategy for reducing deposits at an outlet of the reductant injector in response to the first deviation exceeding the first predetermined threshold.

18. The SCR injection system of claim 17, wherein the control unit is further configured to store at least one of the first pressure drop value and the second pressure drop value; and
   the pressure sensor is integrated into the pump.

* * * * *